Feb. 9, 1937.                  B. STIRN                     2,070,218
                              REED WIPER
                          Filed Aug. 1, 1936
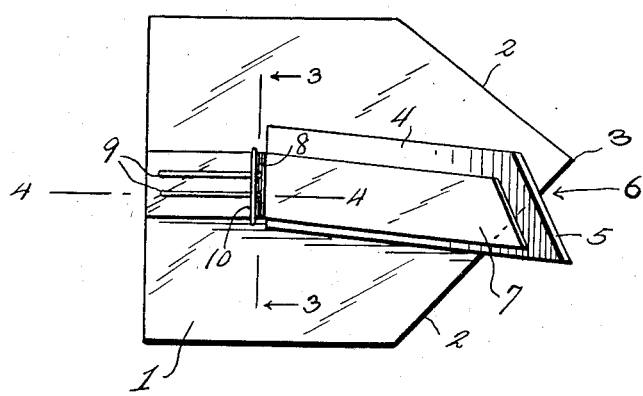
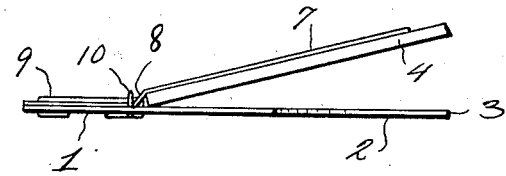
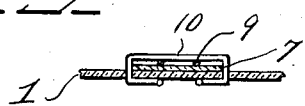      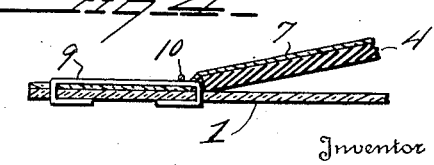
Inventor
B. Stirn
By Watson E. Coleman
Attorney Patented Feb. 9, 1937

2,070,218

UNITED STATES PATENT OFFICE 2,070,218

REED WIPER

Bertram Stirn, Brooklyn, N. Y.

Application August 1, 1936, Serial No. 93,895

4 Claims. (Cl. 84—453)

This invention relates to the class of music and pertains particularly to accessory devices for use in association with wind instruments.

The present invention has for its primary object to provide a novel wiper device for removing moisture from the reed of a wind instrument and is designed particularly as a saxophone reed wiper.

Another object of the invention is to provide a reed wiper having a novel form and arrangement of base and wiper element whereby the insertion of the reed between the base and wiper element is facilitated and insures the proper disposition of the reed under the wiper without damage to the reed.

A still further object of the invention is to provide a novel form of reed wiper wherein a relatively stiff body is provided with a flexible wiper element which is initially attached to the body in such a manner as to normally maintain an open or spaced relation therewith whereby the insertion of the reed beneath the wiper is further facilitated.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view in plan of the wiper embodying the present invention.

Figure 2 is an edge view of the same.

Figure 3 is a section on the line 3—3 of Figure 1.

Figure 4 is a section on the line 4—4 of Figure 1.

Referring now more particularly to the drawing, wherein like numerals of reference designate corresponding parts throughout the several views, the numeral 1 indicates a flat relatively thin body which is preferably fairly stiff in character and which has two convergently related edges 2 which form a point 3 at approximately the longitudinal center of the body. This body 1 may be formed of any suitable material but it is preferred that it consist of a sheet of cellophane of a relatively thick character so that while it will be yielding it will, at the same time, have sufficient stiffness to maintain its form and to be employed in the desired manner for the wiping of a reed, as hereinafter described.

The numeral 4 designates a flat strip of soft material which is preferably rubber. This wiper strip 4 is disposed against one face of the base 1 to extend longitudinally of the base and at the end thereof which is adjacent the point 3 at the base, the strip is cut obliquely, as indicated at 5, so that this oblique edge 5 and one edge 2 of the base body will lie in crossed relation and thus form a V-like area, which is designated 6, into which the edge of the reed may be placed. This V-like formation of the edges 2 and 5 facilitates the guiding of the reed into position between the wiper body 4 and the base body 1.

The body 4 is secured at the end remote from the edge 5, to the base 1 by means of a strip of attaching material, which is indicated by the numeral 7, and which, while it may be of any suitable substance, is preferably a strip of cellophane. As shown, this attaching strip 7 extends through a portion of the length of the wiper element 4 and across the inner end thereof to the body 1 and is secured to the body in a suitable manner so as to form a hinge at the point 8. The means of securing the strip 7 to the base is here illustrated as consisting of a pair of metallic clips 9, extending lengthwise of the portion of the strip which is in contact with the base and a metallic clip 10 which is disposed across the strip 7 in close proximity to the end of the wiper element 4. These clips are of the type commonly employed for securing paper sheets together. While this method of attaching the strip 7 to the base 1, as illustrated and described is preferred, it is, of course to be understood that the invention is not limited to this particular construction.

With the arrangement shown, it will be apparent that the inner end of the resilient wiper body 4 is firmly held against the base body 1 and thus when the wiper 4 is pressed down, its inner end will be compressed slightly and will act as a resilient means for raising the wiper when it is released.

It will also be apparent that with the novel arrangement of the edges 2 and 5, a wind instrument reed may be readily inserted between the wiper 4 and the base 1 to be drawn across the base so as to thoroughly remove all moisture from the reed.

In the use of the wiper, the same is held between the index finger and thumb of the left hand. The index finger is placed under the base 1 in a curled position and the thumb is on top of the wiper body 7 and 4. The reed is inserted from the side, at the V-shaped opening, and holding the wiper firmly with the thumb and index finger, the reed is pulled backwards until it is free and clear of the wiper. This removes all moisture externally and internally from the reed.

After the reed is removed from the wiper, the moisture that was in the reed will remain on the non-absorbent base 1, which is preferably cellophane, and on the body 4, and the moisture on the body 4 will run off onto the base. This moisture collected on the base may be removed to a large extent by flicking the device and that remaining will tend to spread out in a thin film and dry almost immediately, because the base 1 is not of an absorbent material. If the base 1 were of an absorbent material, it would be always moist and would be unsanitary.

I claim:—

1. A wiper device of the character described comprising two flat bodies disposed in side by side relation, one of said bodies being formed of a yielding material suitable for use as a wiper element, securing means between the bodies whereby adjacent ends of the two bodies may be separated for the insertion of an article therebetween, and said bodies having the separable ends thereof cut along intersecting lines whereby the two ends together form a V into which the said article may be inserted to be guided to position between the bodies.

2. A wiper comprising a flat body of relatively stiff material, a wiper unit comprising a flat strip of resilient material disposed against one face of said body and secured at one end thereto, the other end of said strip being cut obliquely, and said body having an edge extending transversely of the obliquely cut end edge of said strip whereby to form therewith a substantially V-shaped entrance area for guiding a flat body into position between the strip and the body carrying the same.

3. A wiper of the character described comprising a flat body of relatively stiff material, a strip of rubber disposed against one side of said body, a resilient hinge strip connecting an end of said rubber strip with the body whereby the other end of the rubber strip may be oscillated relative to the body, said body having an edge extending obliquely across said rubber strip and said rubber strip having the said other end cut obliquely and lying across the said edge of the body.

4. A wind instrument reed wiper comprising a pair of flat bodies arranged in side by side relation, one of said bodies being of relatively stiff material, the other of said bodies being in the form of a flat strip of yielding material suitable for use as a wiper element and a flexible hinge strip securing the said bodies together at one end whereby the adjacent other ends of the bodies may be separated to facilitate the insertion of a reed therebetween.

BERTRAM STIRN.